United States Patent [19]

Sköld et al.

[11] Patent Number: 5,125,717
[45] Date of Patent: Jun. 30, 1992

[54] ADJUSTABLE BOOSTER SEAT FOR JUVENILE AUTO PASSENGERS

[75] Inventors: Björn-Ake Sköld, Norrköping; Claes Tingvall, Tyresö, both of Sweden

[73] Assignee: Folksam Ömsesidig Sakförsäkring, Stockholm, Sweden

[21] Appl. No.: 346,022

[22] PCT Filed: Aug. 12, 1988

[86] PCT No.: PCT/SE88/00411
§ 371 Date: May 12, 1989
§ 102(e) Date: May 12, 1989

[87] PCT Pub. No.: WO89/01423
PCT Pub. Date: Feb. 23, 1989

[30] Foreign Application Priority Data
Aug. 18, 1987 [SE] Sweden ............... 8703202

[51] Int. Cl.⁵ ............................................... A47C 1/08
[52] U.S. Cl. ............................................. 297/250; 297/3
[58] Field of Search ................. 297/3, 1, 250, 230, 297/231, 216, 464

[56] References Cited
U.S. PATENT DOCUMENTS

| | | | |
|---|---|---|---|
| 2,776,700 | 1/1957 | Potter et al. | 297/3 |
| 3,556,586 | 1/1971 | Beardmore | 297/3 |
| 4,274,674 | 6/1981 | Deloustal | 297/250 |
| 4,345,791 | 8/1982 | Bryans et al. | 297/250 |
| 4,501,435 | 2/1985 | Kincheloe | 297/250 |
| 4,521,052 | 6/1985 | Cone | 297/3 |
| 4,687,452 | 8/1987 | Hull | 297/250 X |

FOREIGN PATENT DOCUMENTS

| | | | |
|---|---|---|---|
| 2409127 | 9/1975 | Fed. Rep. of Germany | 297/3 |
| 2288644 | 5/1976 | France | 297/464 |
| 454014 | 3/1936 | United Kingdom | 297/3 |

Primary Examiner—Jose V. Chen
Attorney, Agent, or Firm—Cushman, Darby & Cushman

[57] ABSTRACT

A booster seat for juvenile auto passengers, including an invertible booster cushion with a double-sided seating plane member located so that different seating heights are obtained depending on which seating surface of the cushion is disposed facing upward for use. The seat can also include a back rest, the height of which also is adjustable.

8 Claims, 2 Drawing Sheets

ADJUSTABLE BOOSTER SEAT FOR JUVENILE AUTO PASSENGERS

BACKGROUND OF THE INVENTION

This invention relates to a booster seat, which makes it possible for children to use the ordinary automobile seat belts intended for adult passengers.

Booster seats have been in use for several years, to adapt the webbing of the automobile seat belt to a child passenger. Those booster seats have included booster cushions provided with straps and guides or adjustable loops for adaptation of the webbing to the child user.

The earlier booster seats have all been formed to make one adaptation of the webbing irrespective of the size of the child, although the adaptation can differ between different booster seats. Due to the fact that these booster seats are used by children from about 3 years age to about 12 years age, the size of the child user differs substantially during these years, and consequently the adaptation of the webbing is not the best during the whole span of normal expected use.

SUMMARY OF THE INVENTION

The object of this invention is to provide a booster seat by means of which it is possible to adjust the adaptation of the webbing depending on the size of the child user.

BRIEF DESCRIPTION OF THE DRAWINGS

The invention will now be described in form of non-limiting embodiment, shown in the appended drawings.

In the Drawings, FIG. 1 are shown two views of a booster seat according to the invention, to the left showing the seat adapted for a larger child than the seat shown to the right, and in FIG. 2 is shown an exploded view of the booster seat according to the invention.

DETAILED DESCRIPTION

Figure 1:
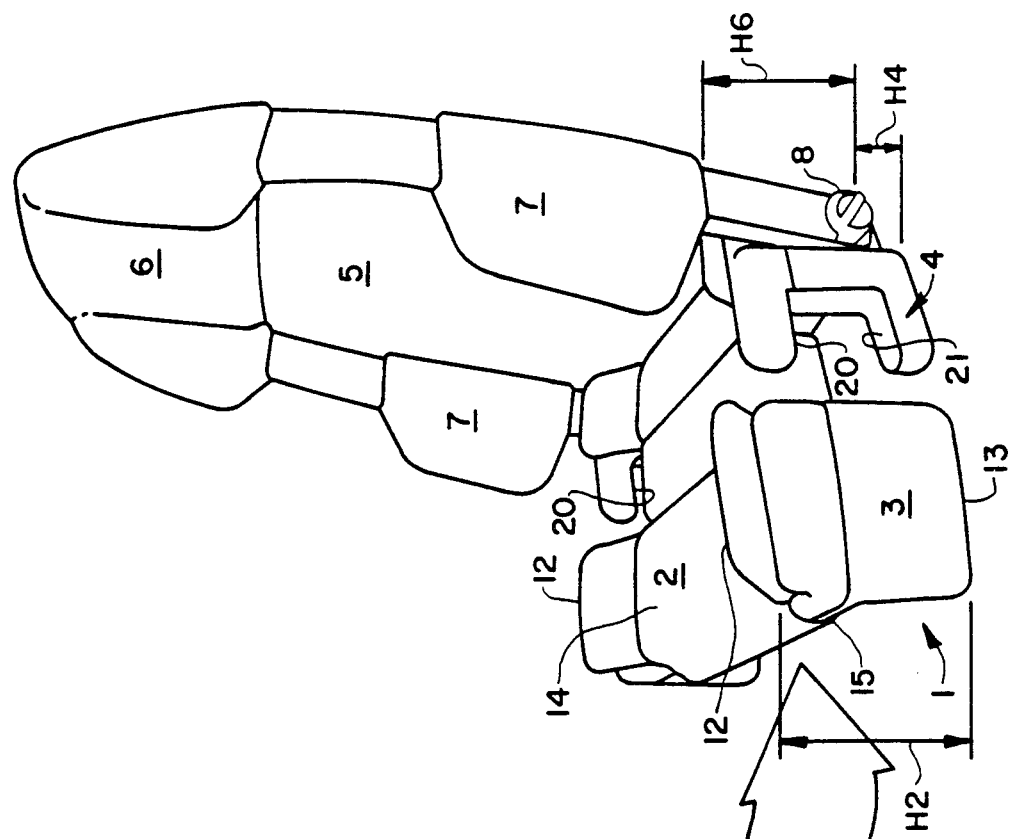
Figure 2:
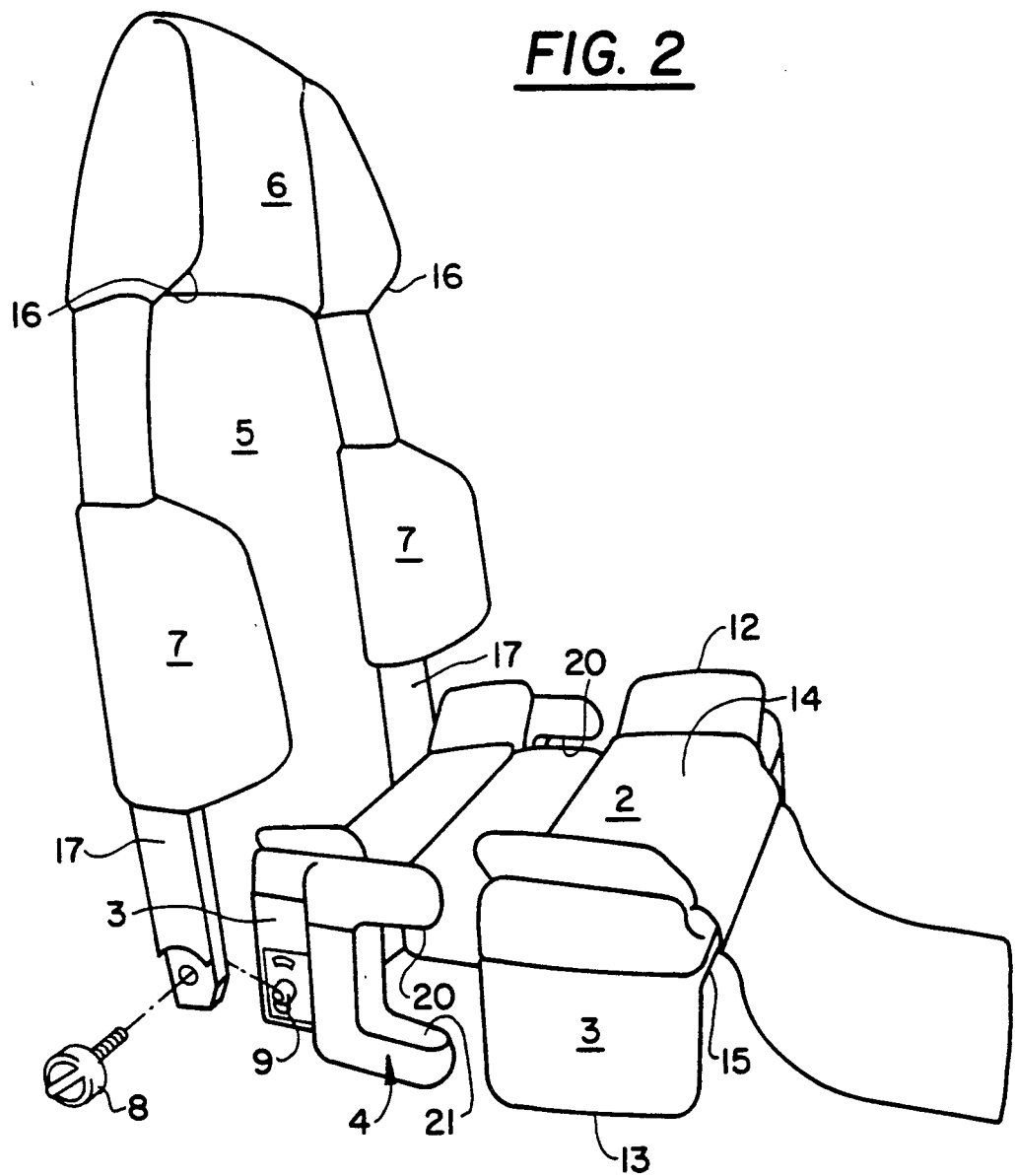

The booster seat shown includes a booster cushion 1 with a double sided seating plane 2 and side portions 3. The side portions 3 also include safety belt guides 4. The booster cushion 1 is so formed that it can be turned upside-down, and be used in both the one-side-up orientation shown at the left in FIG. 1, and in the other-side-up orientation shown at the right in FIG. 1. The seating plane 2 is not located on the middle of the height of the side portions 3, but displaced towards one of the horizontal ends 12, 13 of the side portions 3, namely the end 12. By this arrangement, the generally horizontal support surfaces 14, 15 provided on opposite faces of the seating plane member 2 provide different seat levels, which can be obtained by locating the booster cushion 1 in one or the other location of its mutually inverted orientations. The safety belt guides 4 are formed with guide means 20, 21 on both lateral sides of the booster cushion 1 and also above and below, respectively both upper and lower surfaces 14, 15 of the cushion to be able to act as guides for the ordinary safety belt of an automobile in both orientations of the booster cushion 1.

As shown in the drawings the booster seat can also include a back rest 5. The back rest 5 is provided with a head rest 6, the lower side part 16 of which is formed to also act as a guide means for the shoulder belt of the ordinary automobile three point safety belt. The back rest 5 can also, as shown in the drawings, be provided with detachable and adjustable side supports 7, to give side support to a child sitting on the seat.

To make it possible to turn the booster cushion 1 upside down, the back rest 5 is connected to the booster cushion 1 by means of grip screw means 8 penetrating side beams 17 of the back rest and secured in threaded sockets 9 in the back part of the booster cushion 1. The sockets 9 are so located in the booster cushion 1 that they are at the bottom of the booster cushion when this is turned so that the seating plane 2 is in its most elevated position (shown at the right in FIG. 1), and thus so that they are located at the top of the booster cushion when the booster cushion is inverted, as indicated by the turnover arrow 18, so that the seating plane is at its lowermost position (shown at the left in FIG. 1). By this arrangement, the height of the back rest 5 is adapted to the intended use for different sizes of the occupants. Thus, with a smaller and shorter child, the booster cushion 1 should be turned so that the seating plane 2 is in its most elevated position (as shown at the right in FIG. 1) and in this case the back rest 5 will then be in its lowermost position. When a somewhat taller child is using the booster seat the cushion should be turned with its seating plane 2 in its lowermost position (as shown at the left in FIG. 1) and then the back rest with the head rest 6 will be in its uppermost position.

Thus, an adjustable booster seat according to the invention makes it possible to adapt the seating height of the child to the adult safety belt and it also makes it possible to adjust the height of the head rest to the size of the child.

We claim:

1. A booster seat for a juvenile automobile passenger, adapted to be supported on an automotive passenger seat having a safety belt including a lap belt and a shoulder belt for securing a passenger on the automotive passenger seat by closely frontally part-encircling a passenger occupying the automotive passenger seat, said booster seat comprising:

an invertible booster cushion including a generally horizontal seating plane member having first and second generally horizontal seating surfaces provided on opposite faces of said seating plane member to be alternately useful for being sat upon when disposed so as to be upwardly facing; said seating plane member having two laterally opposite ends;

said booster cushion further including two generally vertical side portions each having first and second generally horizontal opposite ends; said side portions being secured in relation to respective of said laterally opposite ends of said seating plane member so that when said first seating surfaces faces upward, said first ends are disposed above said first seating surface and said second ends are disposed below said second seating surface, with said first ends being disposed less far above said first seating surface than said second ends are disposed below said second seating surface; said second ends being disposed to rest on an automotive passenger seat when said first seating surface faces upward, thereby providing a first, higher level for a juvenile user to be supported on said booster seat, and said first ends being disposed to rest on an automotive passenger seat when said second seating surface faces upward, thereby providing a second, lower level for a juvenile user to be supported on said booster seat;

each of said side portions being provided with first and second alternately useful guide means respectively disposed so that when said first seating surface faces upward, said first guide means are disposed above said first level and said second guide means are disposed below said second level, with said first guide means being disposed a lesser distance above said first level than said second guide means are disposed below said second level, so that a lap belt of an automotive passenger seat safety belt may be held closer at the laterally opposite sides of the seating plane member when a smaller juvenile user is being supported at said first, higher level on said first seating surface, than when a larger juvenile user is being supported at said second lower level on said second seating surface, generally in correspondence to lesser thickness of the smaller juvenile user than the larger juvenile user;

a generally vertical back rest; and grip screw means detachably securing said back rest to said booster cushion alternatively at each of two positions, for providing back support to a juvenile user, respectively when seated on said first seat surface and said second seat surface, said back rest being thereby secured to said booster cushion such that the back rest is at a lowermost position relative to said booster cushion when said first seating surface faces upward and the back rest is at an uppermost position relative to said booster cushion when said second seating surface faces upward, whereby the height of the back rest is adaptable to the height of the juvenile user.

2. The booster seat of claim 1, wherein:

said back rest includes two opposite side rails having lower end portions having openings provided transversally therethrough;

said side portions of said booster cushion being provided with sockets;

said grip screw means passing through said openings and being removably mounted in said sockets, for detachably securing said back rest to said booster cushion.

3. A booster seat for a juvenile automobile passenger, adapted to be supported on an automotive passenger seat having a safety belt including a lap belt and a shoulder belt for securing a passenger on the automotive passenger seat by closely frontally part-encircling a passenger occupying the automotive passenger seat, said booster seat comprising:

an invertible booster cushion including a generally horizontal seating plane member having first and second generally horizontal seating surfaces provided on opposite faces of said seating plane member to be alternately useful for being sat upon when disposed so as to be upwardly facing; said seating plane member having two laterally opposite ends;

said booster cushion further including two generally vertical side portions each having first and second generally horizontal opposite ends; said side portions being secured in relation to respective of said lateraly opposite ends of said seating plane member so that when said first seating surface faces upward, said first ends are disposed above said first seating surface and said second ends are disposed below said second seating surface, with said first ends being disposed less far above said first seating surface than said second ends are disposed below said second seating surface; said second ends being disposed to rest on an automotive passenger seat when said first seating surface faces upward, thereby providing a first, higher level for a juvenile user to be supported on said booster seat, and said first ends being disposed to rest on an automotive passenger seat when said second seating surface faces upward, thereby providing a second, lower level for a juvenile user to be supported on said booster seat;

each of said side portions being provided with first and second alternately useful guide means respectively disposed so that when said first seating surface faces upward, said first guide means are disposed above said first level and said second guide means are disposed below said second level, with said first guide means being disposed a lesser distance above said first level than said second guide means are disposed below said second level, sot hat a lap belt of an automotive passenger seat safety belt may be held closer at the laterally opposite sides of the seating plane member when a smaller juvenile user is being supported at said first, higher level on said first seating surface, than when a larger juvenile user is being supported at said second lower level on said second seating surface, generally in correspondence to lesser thickness of the smaller juvenile user than the larger juvenile user;

a generally vertical back rest; and grip screw means detachably securing said back rest to said booster cushion for providing back support to a juvenile user when seated on either of said first and second seat surface;

said back rest including two opposite side rails having lower end portions having openings provided transversally therethrough;

said side portions of said booster cushion being provided with sockets;

said grip screw means passing through said openings and being removably mounted in said sockets, for detachably securing said back rest to said booster cushion;

said sockets being disposed closer to said second ends of said side portions than to said first ends of said side portions, so that said back rest is carried lower on said booster cushion when said first seating surface faces upward than when said second seating surface faces upward.

4. The booster seat of claim 3, wherein:

said back rest includes a head rest portion having forwardly-projecting laterally opposite side members provided with respective lower edges, which lower edges are available, in use, to serve as guide means for a shoulder belt of an automotive passenger seat safety belt when such safety belt is secured in frontally partially encircling relation to a juvenile user seated on the booster seat.

5. The booster seat of claim 3, further including:

said back rest includes a head rest portion having forwardly projecting laterally opposite side members provided with respective lower edges, which lower edges are available, in use, to serve as guide means for a shoulder belt of an automotive passenger seat safety belt when such safety belt is secured in frontally partially encircling relation to a juvenile user seated on the booster seat; and vertically adjustable side supports detachably secured to said side rails so as to project forwardly therefrom for confiningly supporting a juvenile user between them.

6. A booster seat for a juvenile automobile passenger, adapted to be supported on an automotive passenger seat having a safety belt including a lap belt and a shoulder belt for securing a passenger on the automotive passenger seat by closely frontally part-encircling a passenger occupying the automotive passenger seat, said booster seat comprising:

an invertible booster cushion including a generally horizontal seating plane member having first and second generally horizontal seating surfaces provided on opposite faces of said seating plane member to be alternately useful for being sat upon when disposed so as to be upwardly facing; said seating plane member having two laterally opposite ends;

said booster cushion further including two generally vertical side portions each having first and second generally horizontal opposite ends; said side portions being secured in relation to respective of said laterally opposite ends of said seating plane member so that when said first seating surface faces upward, said first ends are disposed above said first seating surface and said second ends are disposed below said second seating surface, with said first ends being disposed less far above said first seating surface than said second ends are disposed below said second seating surface; said second ends being disposed to rest on an automotive passenger seat when said first seating surface faces upward, thereby providing a first, higher level for a juvenile user to be supported on said booster seat, and said first ends being disposed to rest on an automotive passenger seat when said second seating surface faces upward, thereby providing a second, lower level for a juvenile user to be supported on said booster seat;

each of said side portions being provided with first and second alternately useful guide means respectively disposed so that when said first seating surface faces upward, said first guide means are disposed above said first level and said second guide means are disposed below said second level, with said first guide means being disposed a lesser distance above said first level than said second guide means are disposed below said second level, so that a lap belt of an automotive passenger seat safety belt may be held closer at the laterally opposite sides of the seating plane member when a smaller juvenile user is being supported at said first, higher level on said first seating surface, than when a larger juvenile user is being supported at said second lower level on said second seating surface, generally in correspondence to lesser thickness of the smaller juvenile user than the larger juvenile user;

a generally vertical back rest; and grip screw means detachably securing said back rest to said booster cushion for providing back support to a juvenile user when seated on either of said first and second seat surface;

said back rest including a head rest portion having forwardly-projecting lateraly opposite side members provided with respective lower edges, which lower edges are available, in use, to serve as guide means for a shoulder belt of an automotive passenger seat safety belt when such safety belt is secured in frontally partially encircling relation to a juvenile user seated on the booster seat.

7. The booster seat of claim 6, wherein:

said back rest including two opposite side rails having lower end portions having openings provided transversally therethrough;

said side portions of said booster cushion being provided with sockets;

said grip screw means passing through said openings and being removably mounted in said sockets, for detachably securing said back rest to said booster cushion; and vertically adjustable side supports detachably secured to said side rails so as to project forwardly therefrom for confiningly supporting a juvenile user between them.

8. A booster seat for a juvenile automobile passenger, adapted to be supported on an automotive passenger seat having a safety belt including a lap belt and a shoulder belt for securing a passenger on the automotive passenger seat by closely frontally part-encircling a passenger occupying the automotive passenger seat, said booster seat comprising:

an invertible booster cushion including a generally horizontal seating plane member having first and second generally horizontal seating surfaces provided on opposite faces of said seating plane member to be alternately useful for being sat upon when disposed so as to be upwardly facing; said seating plane member having two laterally opposite ends;

said booster cushion further including two generally vertical side portions each having first and second generally horizontal opposite ends; said side portions being secured in relation to respective of said laterally opposite ends of said seating plane member so that when said first seating surface faces upward, said first ends are disposed above said first seating surface and said second ends are disposed below said second seating surface, with said first ends being disposed less far above said first seating surface than said second ends are disposed below said second seating surface; said second ends being disposed to rest on an automotive passenger seat when said first seating surface faces upward, thereby providing a first, higher level for a juvenile user to be supported on said booster seat, and said first ends being disposed to rest on an automotive passenger seat when said second seating surface faces upward, thereby providing a second, lower level for juvenile user to be supported on said booster seat;

each of said side portions being provided with first and second alternately useful guide means respectively disposed so that when said first seating surface faces upward, said first guide means are disposed above said first level and said second guide means are disposed below said second level, with said first guide means being disposed a lesser distance above said first level than said second guide means are disposed below said second level, so that a lap belt of an automotive passenger seat safety belt may be held closer at the laterally opposite sides of the seating plane member when a smaller juvenile user is being supported at said first, higher level on said first seating surface, than when a larger juvenile user is being supported at said second lower level on said second seating surface, generally in correspondence to lesser thickness of the smaller juvenile user than the larger juvenile user;

a generally vertical back rest; and grip screw means detachably securing said back rest to said booster cushion for providing back support to a juvenile user when seated on either of said first and second seat surface;

said back rest including two opposite side rails having lower end portions having openings provided transversally therethrough;

said side portions of said booster cushion being provided with sockets;

said grip screw means passing through said openings and being removably mounted in said sockets, for detachably securing said back rest to said booster cushion;

said back rest including a head rest portion having forwardly-projecting laterally opposite side members provided with respective lower edges, which lower edges are available, in use, to serve as guide means for a shoulder belt of an automotive passenger seat safety belt when such safety belt is secured in frontally partially encircling relation to a juvenile user seated on the booster seat; and vertically adjustable side supports detachably secured to said side rails so as to project forwardly therefrom for confiningly supporting a juvenile user between them.

* * * * *